March 28, 1944. PALLE-FINN BEER ET AL 2,345,087
MOTOR FOR SOUND RECORDING APPARATUS
Filed Sept. 11, 1939
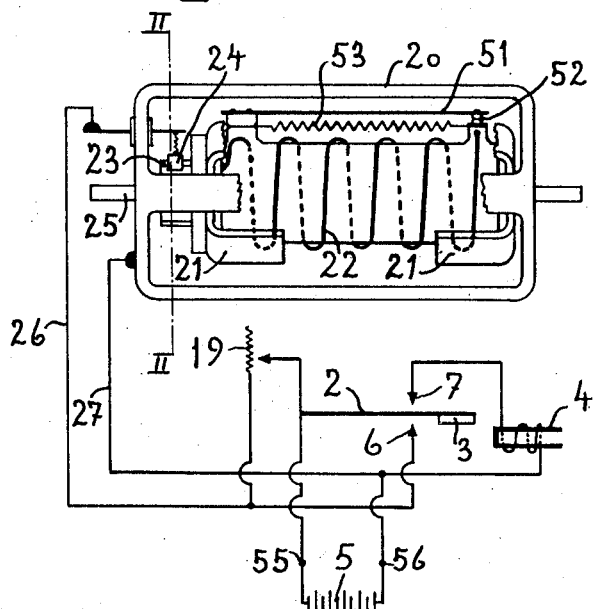
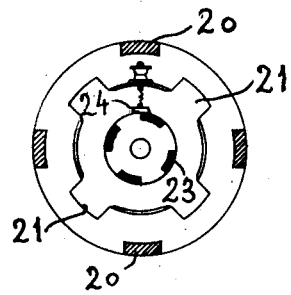
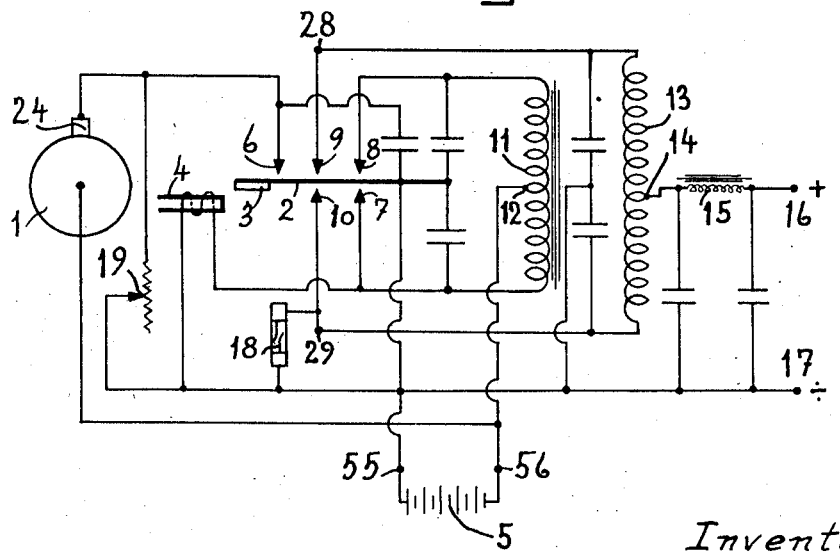
Inventors:
P.-F. Beer and
P.V.I.P. Anneberg
By Young, Emery & Thompson
Attorneys Patented Mar. 28, 1944

2,345,087

UNITED STATES PATENT OFFICE 2,345,087

MOTOR FOR SOUND RECORDING APPARATUS

Palle-Finn Beer and Peter Vilhelm Ingefrid Pedersen Anneberg, Copenhagen, Denmark; vested in the Alien Property Custodian Application September 11, 1939, Serial No. 294,402 In Denmark September 12, 1938

2 Claims. (Cl. 172—239)

The invention relates to a constant speed driving mechanism comprising an electric motor of the impulse driven type and a vibrator operated from a battery to supply current impulses of a constant frequency to the motor, and more especially the invention relates to a mechanism of this kind, in which the motor is supplied with current from an electric battery and is arranged to drive a film feeding mechanism in a portable sound recording camera or combined picture and sound recording apparatus.

One object of the invention is to provide improved means for starting and stopping the said mechanism, and to this end the motor is provided with a rotary circuit breaker in series with the armature of the rotor so that the motor itself controls the supply of an intermittent excitation current to the correct phase and, therefore, can easily be started and run up into synchronism with the said vibrator.

Another object of the invention is to provide speed limitation means preventing the motor from exceeding the speed of synchronism with the frequency of the current impulses by way of which the motor is driven.

Other and similar objects of the invention will be apparent from the reading of the following specification in connection with the accompanying drawing, wherein Fig. 1 a side elevation of the driving motor and an outlined diagram of connections, Fig. 2 a vertical section through the driving motor along the line II—II in Fig. 1, Fig. 3 a modified wiring diagram of the electric circuits.

The driving motor as illustrated in Figs. 1 and 2 is a magneto-electric motor of the impulse driven type the stator of which comprises a cylindrical iron cage with four longitudinal bars or segments 20 interspaced with suitable air gaps. The rotor of the impulse motor comprises an electromagnet with a solenoid winding 22 and pole shoes 21. An interrupted magnetic circuit is formed by the said pole shoes 21 and the motor shaft 25. The latter carries a rotary circuit interrupting device or commutator consisting of electrically interconnected metal segments 23 separated by insulating members.

The rotary breaker 23 is associated with a brush 24 which is insulated from the stator housing and through a conductor 26 is connected with one pole of the D. C. supply source. The segments 23 are connected with one end of the motor winding 22, the other end of which is connected to the stator housing and through a conductor 27 to the other pole of the supply source.

2 is the vibratory member of the electro-magnetic vibrator and carries an armature 3 which cooperates with an electro-magnet 4 in well-known manner. 5 is a battery supplying a direct current through the vibratory member 2 and contacts 6 and 7 of the vibrator to the terminal leads 26 and 27 of the motor. It will be realized that the vibrator will cause a pulsating direct current to flow in the circuit formed by the conductors 26 and 27, the brush 24, one of the segments 23 and the rotor winding, the frequency of the said pulsating direct current being determined by the frequency of the vibrator.

At the moment of starting, the rotor is brought into such a position relative to the stator, that the pole shoes 21 are located asymmetrically relatively to the stator segments 20, whereby the brush 24 will contact with one of the segments 23. The direct current flowing through the rotor winding will then set up a flux causing the pole shoes 21 to be attracted by the stator segments 20 thereby imparting an accelerating torque to the motor. When the angular displacement of the rotor is such that the position of the pole shoes 21 coincides with that of the stator bars 20 the brush 24 will contact with one of the insulating sections thereby interrupting the excitation current in the rotor winding, whereupon the rotor will continue its rotation owing to its inertia, until the pole shoes 21 again reach a position corresponding to maximum attraction to the stator segments when the circuit of the excitation current will again be closed and so forth.

It will be realized that the motor when fed by a pulsating direct current in the manner described will develop an accelerating torque and the speed of the motor will therefore increase until it has reached the synchronous speed corresponding to the frequency of the vibrator. At this stage the motor will function as a synchronous motor, and its speed will therefore remain constant independently of the load variations occurring during its performance.

A derivation circuit feeding the motor 1 with a non-interrupted adjustable direct current is formed by a variable resistance 19 shunted across the vibratory member 2 and the contact 6 of the vibrator. The D. C. component will cause the torque of the motor to be increased which is particularly desirable during the starting period. However, the said D. C. component may also conveniently be maintained when the motor is running at synchronous speed as the load on the vibrator and consequently the formation of sparks between the member 2 and the contact 6 is thereby reduced. As illustrated in Figs. 1 and 2 the rotor of the motor 1 is further provided with a speed limiting device comprising a resistance 53 inserted in series with the rotor winding 22 and normally short circuited by a contact member 52 mounted on a spring 51 which is adapted to keep the said contact closed when the speed of the motor does not exceed the synchronous speed. At overspeed, however, the centrifugal force acting upon the contact member 52 will cause the contact to be opened. The resistance 53 is thereby inserted in series with the rotor winding, the excitation current is reduced and consequently the motor torque is decreased thereby causing the speed of the motor to drop to the normal level.

The main feature of the present invention is based on the observation that when a motor of the kind described is fed by an intermittent direct current instead of a constant direct current as in previous applications such a motor will present outstanding advantages as a driving motor in a film feeding mechanism. On the one hand, at normal film feeding speed the impulse motor will function as a synchronous motor running synchronously with the frequency of the pulsating or intermittent direct current while on the other hand, when running at lower speed it will develop a sufficient torque for pulling itself into synchronism. In order to facilitate synchronization the stator of the motor must be resiliently suspended so as to permit small oscillations around its longitudinal axis.

It will be realized that the combination according to the invention of an impulse motor with a pulsating or intermittent direct current supply, as compared with an ordinary synchronous motor, presents the advantage of developing an accelerating torque at low speed, i. e., the arrangement according to the invention is self-starting, while in comparison to a direct current driving motor the impulse motor presents the same advantage in respect of speed constancy as a synchronous motor.

Fig. 1 shows an outlined wiring diagram of an embodiment of the invention wherein the vibrator as addition to its function of producing a pulsating direct current for the motor is applied to produce a rectified anode voltage for the amplifier associated with or built into the recording apparatus. To this end a pair of additional contacts 7, 8 are associated with the tongue 2 of the vibrator from which a pulsating D. C. is derived to the primary winding 11 of a step-up transformer, the secondary winding of which 13 thereby produces an alternating current of increased voltage. The said A. C. is rectified by means of a third pair of contacts 9, 10 connected to the secondary terminals 28, 29 of the transformer cooperating with the tongue 2 and the rectified current is subsequently smoothened by means of a filter coil 15 connected with the middle point 14 of the winding 13 before it is supplied to the anode terminals 16 and 17 as a direct current of a higher voltage than that provided by the supply source 5. A glow lamp 18 is shunted across the contact 10 and the middle point 14 of the transformer and is thereby supplied by an A. C. of the frequency of the vibrator.

Having now particularly described and ascertained the nature of our invention and in what manner the same is to be performed we declare that what we claim is:

1. A constant speed drive mechanism comprising an electric motor of the impulse driven type having a rotary armature coil, a commutator connected to said coil, a source of direct current, and an electromagnetic vibrator driven from said source and connected between said source and motor whereby impulses of constant frequency are supplied to said coil through said commutator.

2. The combination as defined in claim 1 wherein connections are provided for supplying, simultaneously with said impulses, direct current from said source to said coil through said commutator.

PALLE-FINN BEER.
PETER VILHELM INGEFRID
   PEDERSEN ANNEBERG.